United States Patent
Chen et al.

(10) Patent No.: US 7,085,275 B2
(45) Date of Patent: Aug. 1, 2006

(54) METHOD FOR ACCESSING A NON-SYMMETRIC DUAL-SLOT ADDRESS TABLE AND SWITCHING APPARATUS USING SAME

(75) Inventors: Jen-Kai Chen, Taipei (TW); Yun-Fei Chao, Taipei (TW)

(73) Assignee: VIA Technologies, Inc., Taipei (TW)

( * ) Notice: Subject to any disclaimer, the term of this patent is extended or adjusted under 35 U.S.C. 154(b) by 996 days.

(21) Appl. No.: 10/131,467

(22) Filed: Apr. 25, 2002

(65) Prior Publication Data
US 2002/0165985 A1   Nov. 7, 2002

(30) Foreign Application Priority Data
May 3, 2001   (TW) ................ 90110665 A

(51) Int. Cl.
*H04L 12/56* (2006.01)
*G06F 12/00* (2006.01)
(52) U.S. Cl. ............... 370/395.32; 370/395.7; 709/245; 711/216; 711/221
(58) Field of Classification Search ........... 370/395.31, 370/395.32, 395.7, 395.71, 395.3; 711/216, 711/221
See application file for complete search history.

(56) References Cited

U.S. PATENT DOCUMENTS

| | | | | |
|---|---|---|---|---|
| 5,920,900 A | * | 7/1999 | Poole et al. | 711/216 |
| 6,424,650 B1 | * | 7/2002 | Yang et al. | 370/390 |
| 6,473,846 B1 | * | 10/2002 | Melchior | 711/170 |
| 6,615,336 B1 | * | 9/2003 | Chen et al. | 711/202 |
| 6,690,667 B1 | * | 2/2004 | Warren | 370/389 |
| 6,697,873 B1 | * | 2/2004 | Yik et al. | 709/238 |

* cited by examiner

*Primary Examiner*—Hassan Kizou
*Assistant Examiner*—Brian Roberts
(74) *Attorney, Agent, or Firm*—Rabin & Berdo P.C.

(57) ABSTRACT

A method and apparatus for accessing a non-symmetric dual-slot address table having two entries 0, 1 that are different in size. When writing data, the data is hashed to generate a hash value. Then, the data is written to a slot corresponding to the hash value in the entry 0. When there was data in the slot 0, the hash value is mapped to a sub-address and a share value, and then a slot 1 corresponding to the sub-address is selected from the entry 1. Afterwards, the SMAC tag, the share value and the source port are written to the slot 1. In addition, when transmitting the packet, a hash value is generated according to the DMAC address. Then, a SMAC tag, the share value and the source port are read according to the hash value. After compared, the packet is transmitted.

20 Claims, 4 Drawing Sheets

METHOD FOR ACCESSING A NON-SYMMETRIC DUAL-SLOT ADDRESS TABLE AND SWITCHING APPARATUS USING SAME

CROSS-REFERENCE TO RELATED APPLICATION

This application claims the priority benefit of Taiwan application serial no. 090110665, filed May 3, 2001.

BACKGROUND OF THE INVENTION

1. Field of the Invention

This invention relates in general to an accessing method for address data and a network switching apparatus using the same. More particularly, the invention provides a method and apparatus for accessing a non-symmetric dual-slot address table.

2. Description of Related Art

To access the internet, a hardware interface responsible for tranceiving is required. In general, except the home users usually use modems to access the internet, other network systems are connected to each other by network cards. For example, many personal computers (PC) are connected to servers through the network cards, and then connected to the network through the servers. Therefore, the network card is a media, through which the PCs can be connected to the network.

FIG. 1 shows a schematic diagram that two PCs are connected via the network. As shown, the PC 130 and the PC 150 are connected by the network 100, i.e. the two PCs can communicate to each other to transfer data. Due to the limited bandwidth, prior to transmitting data, the data is divided into many small packets to facilitate data transmission. In each packet, a media access control (MAC) address of the PC is recorded for telling where the packet is transmitted from and where the packet is transmitted to in order to prevent the packet lost. Simply speaking, each network card in each PC records the MAC address of the PC, which is like an address number (the MAC address). When the data is transmitted through the network, the packets can be continuously transmitted to the correct destination according to the specified MAC address, such that the data can be surely transmitted.

FIG. 2 shows a schematic diagram of a packet. The packet 200 stores information of MAC address 210. In general, the MAC address information 210 contains a source MAC (SMAC) address 210a and a destination MAC (DMAC) 210b address, according to which the data transmission can be executed. Referring to FIGS. 1 and 2, if the PC 130 is at a port 13 and intends to transmit data to the PC 150 at a port 15 through the network 100, the PC 130 divides the data into a plurality of packets 200. In each packet 200, the MAC address information 210 shows that the SMAC address 210b is 130 (the source of the packet is the PC 130) and the DMAC address 210a is 150 (the destination of the packet is the PC 150). Then, a network switching device looks up an address table (not shown) according to the DMAC address 210a to know that the PC 150 is at the port 15, thereby the packet 200 is transmitted to the PC 150. As described above, prior to the data transmission, the address information of a remote PC must be found by referring to the address table. The network switching device has a memory to store such an address table for storing a plurality of MAC addresses to facilitate data transmission.

FIG. 3A is a structure of an address table stored in the memory. In the memory of each switching device, a particular area is allocated as the address table 310 for storing the MAC address information of computers on the network. The MAC address content has been described above, which will not be explained here. Because the address table 310 uses a certain region of the memory 300, the size can be varied according to different demands, for example 4K or 8K etc. Taking a 4K address table as an example, the memory 300 can allocate 4K addresses (0 to 4K−1) to the address table 310 for storing the MAC address information. Therefore, the address table 310 has 4K buckets for storing 4K different MAC address information respectively. For simplicity, the numbers for the buckets and the memory addresses are the same. For example, address 0 corresponds to the entry 0, address 1 corresponds to the entry 1 . . . and address 4K−1 corresponds to the entry 4K−1. Namely, in the memory 300, the 4K buckets correspond to 4K addresses 0 to 4K−1, respectively. In the following paragraph, the method for writing the MAC address information to the address table is described.

FIG. 3B shows a method for writing to the address table in FIG. 3A. Prior to writing a SMAC address to an entry, a CRC hash operation is performed to obtain a hash value. Next, to find an address in the address table 310 corresponding to the hash value, the SMAC address information is written to that address. In order that the hash values correspond to the 4K addresses one by one, a 12-bit CRC hash operation is performed so that the obtained hash value has also 12 bits. According to the various hash values, 4K addresses can be mapped onto correspondingly. In practice, the SMAC address with 48 bits is used for calculating the hash value, and then the SMAC address and the source port information are written to the corresponding entry to facilitate the table look-up.

For example, assume that a PC A is at port 5 and its SMAC address is A, a PC B is at port 7 and its SMAC address is B. After the PC A and the PC B are connected by the switching device, the switching device calculates the SMAC address (A) of the PC A according to the CRC hash operation to obtain a hash value, for example 20. Afterwards, the switching device writes the SMAC address information of the PC A (A) and the source port (5) to the entry 20 of the address table. When the PC A intends to transmit the packets, that SMAC=A and DMAC=B are stored therein, to the PC B, the switching device perform the CRC hash operation to the DMAC address (B) to obtain a hash value, for example 35. Then, an entry 35 is found according to the hash value 35, in which the source port (7) of the PC B has already been recorded. Accordingly, the packet can be transmitted to the port 7 to complete the packet transmission. It should be noticed that the hash values calculated from the various 48-bits SMAC addresses by the 12 bit CRC hash operation are not one-to-one correspondence for those SMAC addresses. Namely, after the CRC hash operation, a 48 bit data is reduced to an expression of 12 bit hash value, which means that some information in the 48 bits disappear. Therefore, it is highly possible that two SMAC addresses may have the same hash value after the CRC hash operation. However, because each address in the address table can only store one MAC address information, one of the MAC addresses may be abandoned if two SMAC addresses have the same hash value, thereby causing data lost. To compensate the drawback, the conventional method makes the 4K addresses in the memory correspond to 2K buckets, which will be described in the following paragraph.

FIG. 4A shows a structure of a conventional dual-slot address table. Taking a 4K address table as an example, the 4K addresses (0 to 4K−1) are assigned to an address table 410. In the design, each entry has two slots: slot 0 and slot 1. Namely, 2K buckets can store 4K address data. It should be noticed that the address table 410 is a symmetric dual-slot address table because the address table 410 is composed of two slots having equal size. FIG. 4B shows a method for writing to the address table in FIG. 4A. As shown, after a SMAC address is operated by the CRC hash operation, the obtained hash value is 1K such that the address data is written to the entry 1K of the address table. However, there are tow slots corresponding to the hash value 1K, the address data is priorly written to the slot 0, rather than the slot 1. If there is another MAC address of the network card has the same hash vale of 1K after the 11 bit CRC hash operation, the later MAC address will be written to the slot 1 also corresponding to the hash value of 1K. Accordingly, the later MAC address data will not be lost. In short, when the MAC address is written to the corresponding slot, the slot 0 is first used for writing. If the slot 0 has stored data, then the data will be written to the slot 1. The advantage of this method is that even if two different SMAC addresses have the same hash value after the CRC hash operation, the two SMAC addresses can still be written to the same entry but different slots, thereby the address data will not be lost.

On the other hand, during the packet transmission, in order to ensure that the packet can be properly transmitted to the remote computer, the port number for the remote computer can be obtained according to the records of the DMAC address in the packet while the packet is transmitting. The method has been discussed above, and their details are omitted here. A hash value corresponding to the DMAC address can be found by performing the CRC hash operation. Under the dual-slot configuration, an address information corresponding to the hash value is first found in the address table, and the SMAC address information in the slot 0 corresponding the address is read to determine whether the DMAC and the SMAC addresses are matched. If matched, it means that the recorded source port in slot 0 is the destination of the packet, by which the packet can be transmitted. If not matched, the SMAC address information in the slot 1 corresponding the address is further read to determine whether the DMAC and the SMAC addresses are matched. If matched, it means that the recorded source port in slot 1 is the destination of the packet, by which the packet can be transmitted. However, if the SMAC addresses in the slot 0 and the slot 1 corresponding to the same hash value are not consistent to the DMAC address, the packet is then sent by the broadcast. It should be noticed that the read SMAC address information is not the whole 48 bits SMAC address, but only the significant bits of the SMAC address and the source port. For example, currently, the higher 37 bits (the MAC tag) in the SMAC address are stored, and the lower 11 bits in the SMAC address are not stored. The hash operation will not create that two different MAC addresses have the same hash value and the same MAC tag (MAC[47:11]), but different MAC[10:0]. To retrieve the SMAC address, the hash value and the MAC tag in the slot are operated. However, this mathematical operation is not the points of the invention, which is omitted here.

As described above, in order to prevent from losing one of the SMAC addresses having the same hash value, the address table can be divided into two parts to form two corresponding slots for each entry, so each entry in the address table corresponds to two slots. Therefore, two different MAC addresses having the same hash value are written to the slot 0 and the slot 1 respectively to prevent the data from lost. In addition, because the addresses of the address table correspond to the hash values and the range of the hash values is determined by the bit number of the CRC function, the size of the address table has to be power of 2, such as 2K, 4K, 8K, 16K, if the size of the address table is based on the unit of 1K ($2^{10}$). Accordingly, the size of the address table cannot be adjusted very flexible. In other word, the foregoing method cannot support an address table having a size of an integer multiple of 2. In U.S. Pat. No. 5,920,900, it provides a Hash-based translation method and apparatus with multiple level collision resolution. The conversion method uses a programmable hash technology of an input value to generate a hash value. If a collision occurs in a resolution table, a new resolution table is generated. This procedure is repeatedly performed until all input values are converted. However, this method is too complicated to be implemented by hardware.

In summary, the access method for conventional address table cannot support all the address table having a size of the integer multiple of 2, such as 6K, 10K. In addition, the memory in the switching device cannot be assigned flexibly.

SUMMARY OF THE INVENTION

Accordingly, it is an object of the invention to provide a data accessing method for a non-symmetric dual-slot address table and a switching apparatus using the same. The capacity of the entry 0 is several times of that of the entry 1 for effectively using the memory space.

According to the object(s) of the invention, it is to provide data accessing method and apparatus for a non-symmetric dual-slot address table. The non-symmetric dual-slot address table contains two entries, each having a different size. Namely, the number of the entries 0 is several times of that of the entries 1. When writing data, a CRC hash operation is performed to the SMAC address data to generate a hash value. Then the SMAC tag is written to a slot 0 corresponding to the hash value in the entry 0. When there was data in the slot 0 corresponding to address in the entry 0, the hash value is mapped one-by-one to a sub-address and a share value and then selects a slot 1 corresponding to the sub-address from the entry 1. Afterwards, the SMAC tag, the share value and the source port are written to the slot 1. In addition, when transmitting the packet, a CRC hash operation is performed to the DMAC address to generate a hash value. Then, a SMAC tag stored in the slot corresponding to the hash value in the entry 0 is read, and is compared with the DMAC tag. If the comparison of the SMAC tag and the DMAC tag is the same, the packet is transmitted according to the source port in the slot. In contrast, when the comparison of the DMAC tag and the SMAC tag stored in the slot 0 corresponding to the address in the entry 0 and is not the same, then the hash value is mapped to a sub-address and a share value. Then, the DMAC tag and the share value are compared with the SMAC tag and the share value stored in the slot 1 corresponding to the sub-address in the entry 1. If the comparison is the same, the packet is transmitted according to a source port stored in the slot 1 corresponding to the sub-address in the entry 1.

The invention further provides a switching apparatus having a plurality of ports. The switching apparatus is used for receiving a packet having a SMAC address and a DMAC address from a source port, which is one of the ports. The switching apparatus comprises a memory, a writing device and a transmitting device. The memory can be a SRAM and may have a non-symmetric dual-slot address table, wherein the non-symmetric dual-slot address table has a first entry with m slots and a second entry with n slots, m and n are integers and m is an integer multiple of n, and is used for accessing a plurality of MAC addresses. The writing device is used for writing the SMAC address to the non-symmetric dual-slot address table. A first hash value is generated according to the SMAC address data. A first address corresponding to the first hash value from the non-symmetric dual-slot address table is selected. Next, when the slot corresponding to the first address in the first entry is empty, a tag and the source port of the SMAC address data are written to a slot corresponding to the first address in the first entry. The first hash value is then mapped one-by-one to a first sub-address and a first share value when the slot corresponding to the first address in the first entry is not empty, and then a slot corresponding to the first sub-address in the second entry is selected, and the tag, the first share value and the source port of the SMAC address data are written to the slot corresponding to the first sub-address in the second entry.

In addition, the transmitting device is used for transmitting the packet to a destination port where is one of the ports. A second hash value is generated according to the DMAC address. A second address corresponding to the second hash value is selected from the non-symmetric dual-slot address table. The packet is transmitted according to a destination port in a slot corresponding the second address in the first entry, when a tag of the MAC address is consistent with a tag of the SMAC address in a slot corresponding the second address in the first entry; and the packet is transmitted according to a source port stored in a slot corresponding to a second sub-address in the second entry, when the tag and the second share value of the DMAC address is consistent with a tag and a share value of a SMAC address stored in a slot corresponding to the second sub-address.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENT

Figure 1:
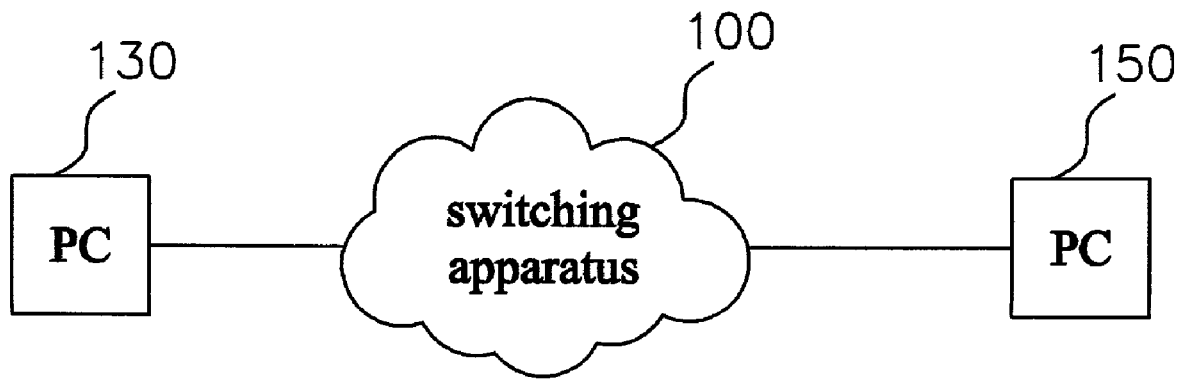
FIG. 1 is a schematic diagram that two computers are connected via a network.
Figure 2:
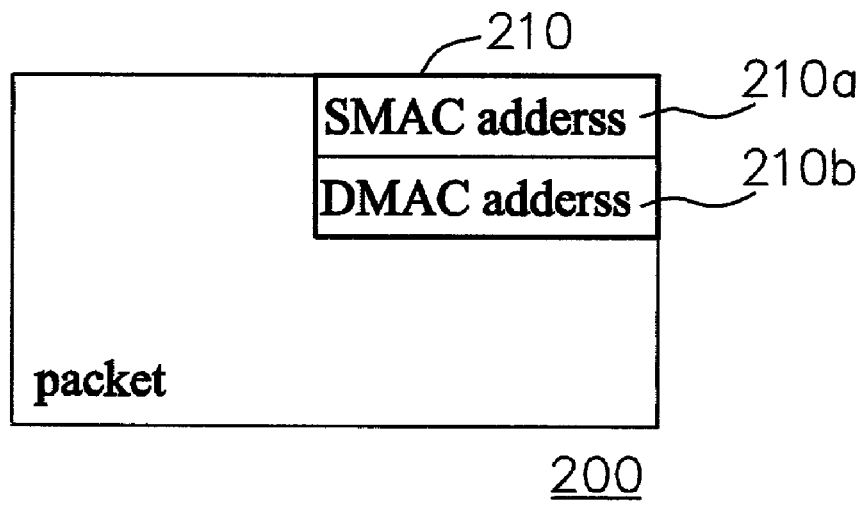
FIG. 2 illustrates the content for a packet.
Figure 3A:
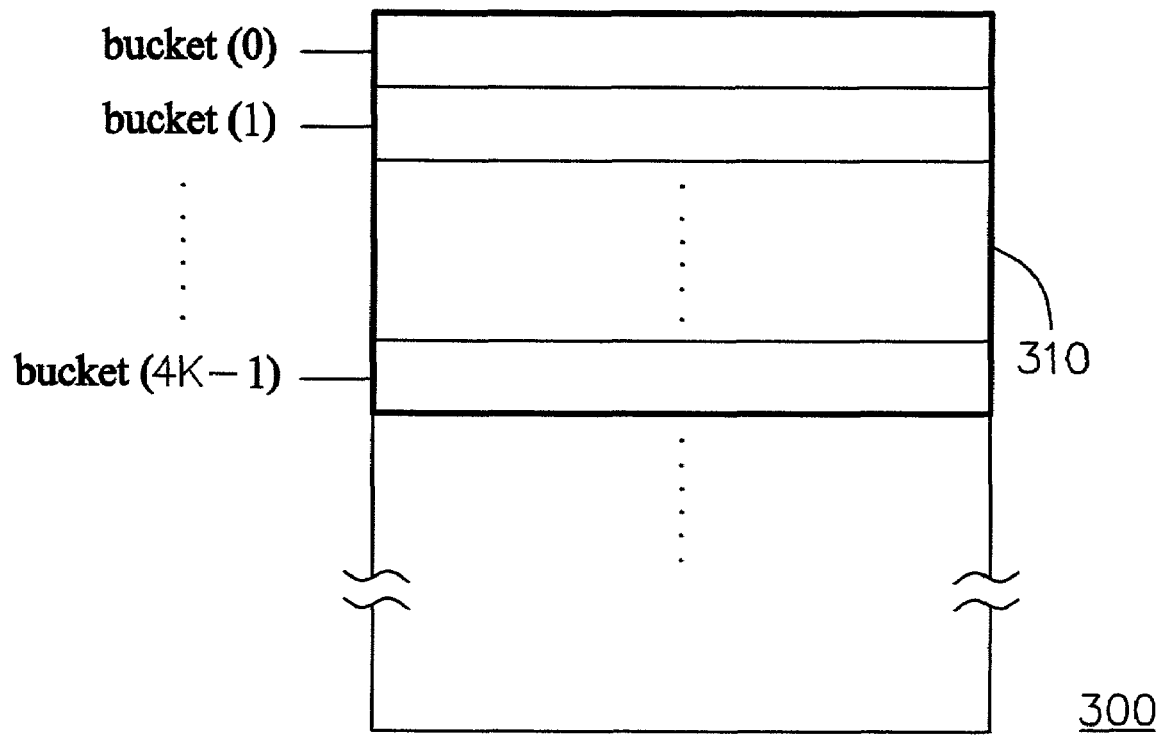
FIG. 3A shows a conventional address structure in a memory.
Figure 3B:
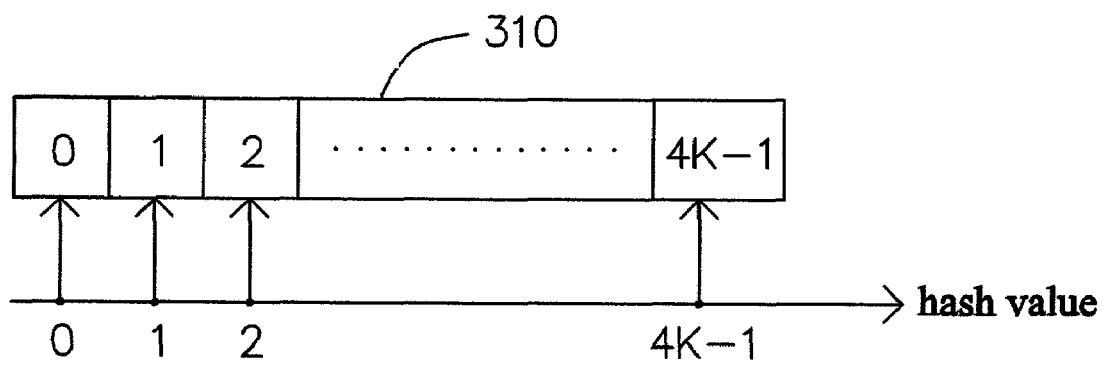
FIG. 3B illustrates a conventional method for writing to the address table in FIG. 3A.
Figure 4A:
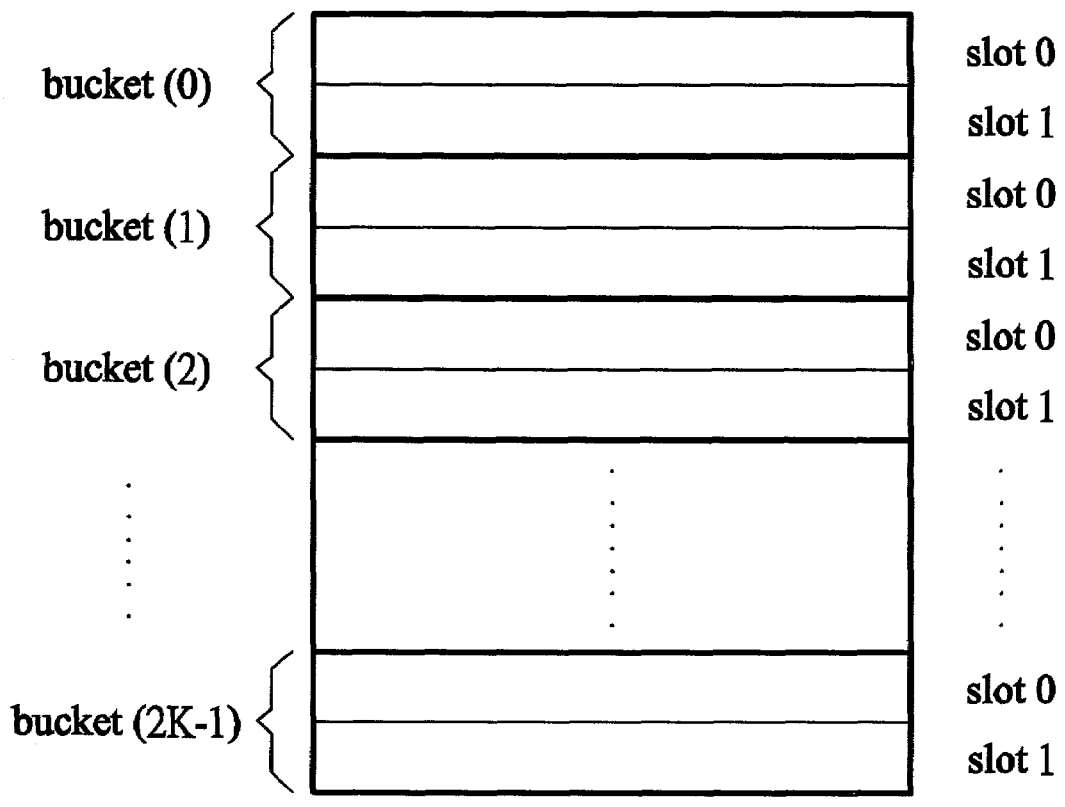
FIG. 4A shows a conventional address structure in a memory.
Figure 4B:
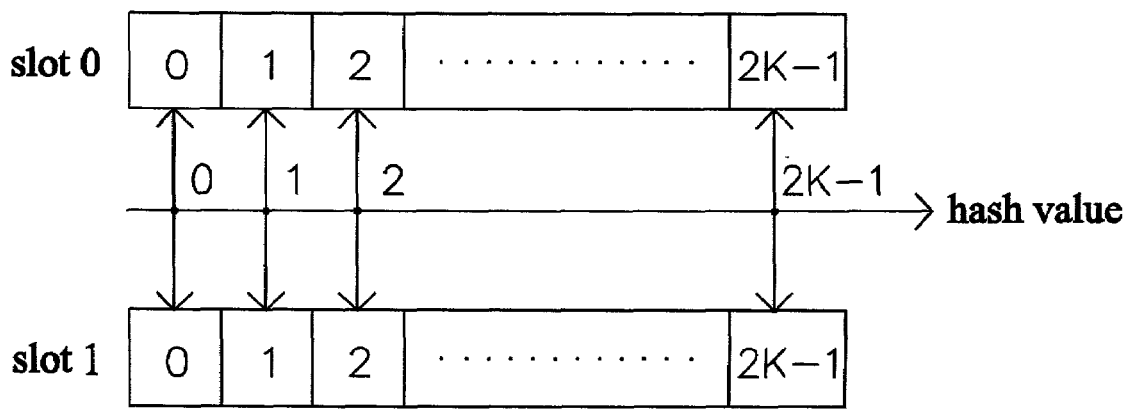
FIG. 4B shows a conventional method for writing to the address table in FIG. 4A
Figure 5A:
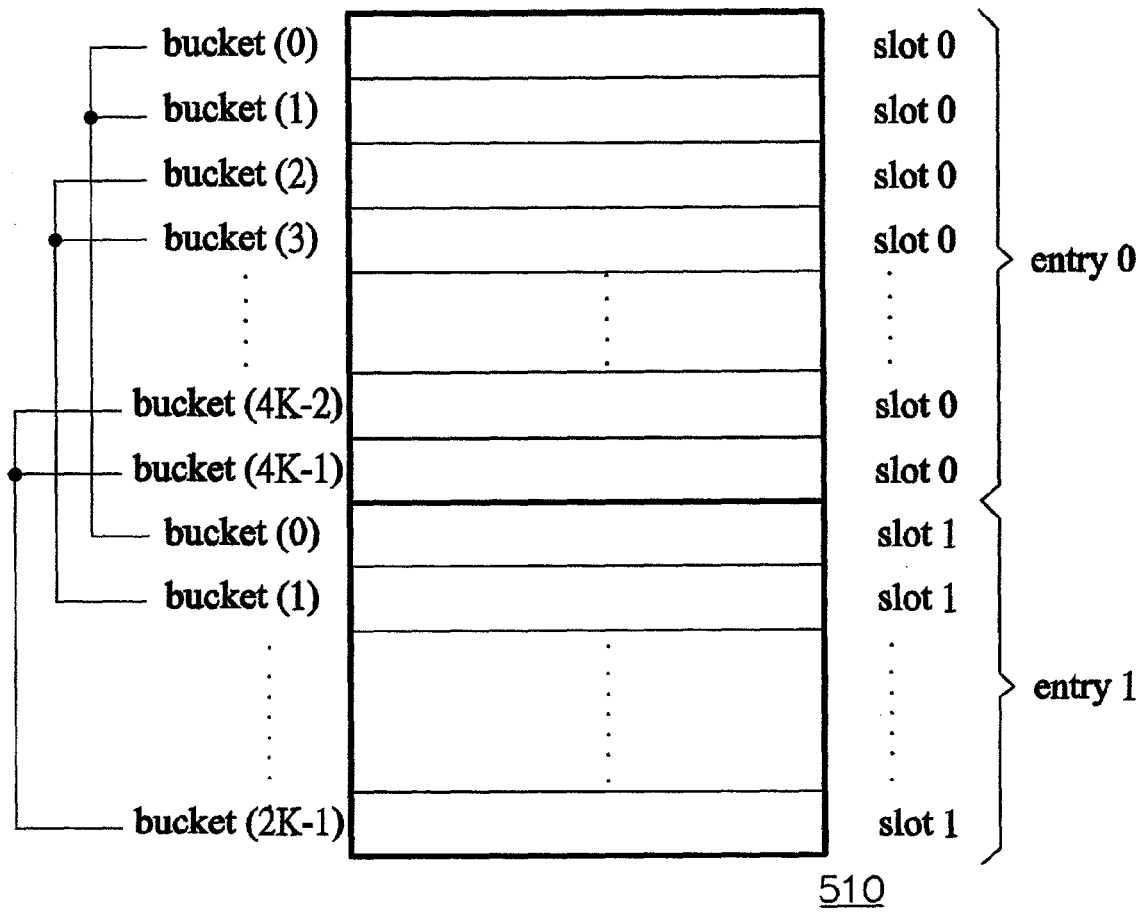
FIG. 5A shows a structure of a non-symmetric dual-slot address table according to the embodiment of the invention.

FIG. 5A shows a schematic structure of a non-symmetric dual-slot address table according to the embodiment of the invention. The non-symmetric dual-slot address table of the invention comprises two entries, both of which do not have to be the same size. For example, assume that the address table has a size of 6K, then the address table can be assigned to have 4K slots 0 and 2K slots 1, i.e., the number of the slot 0 is twice that of the slot 1, such that the address table has 6K slots totally. As shown in FIG. 5A, the address table 510 has two entries that are not symmetric in the size, the entry 0 and the entry 1, such that every two slots 0 share one slot 1 to flexibly utilize the address table. The slots associated with all entry 0 associates with buckets (0) to (4K−1), respectively. Therefore, the entry 0 comprises 4K slots. In addition, 2K slots 1 are shared by bucket (0) to bucket (4K−1) for entry 1.

In most situations, the hash value does not overlap (or collide) often. Generally, the size of the entry 1 being as half as the size of the entry 0, or even ¼ size of the entry 0 is enough.

Figure 5B:
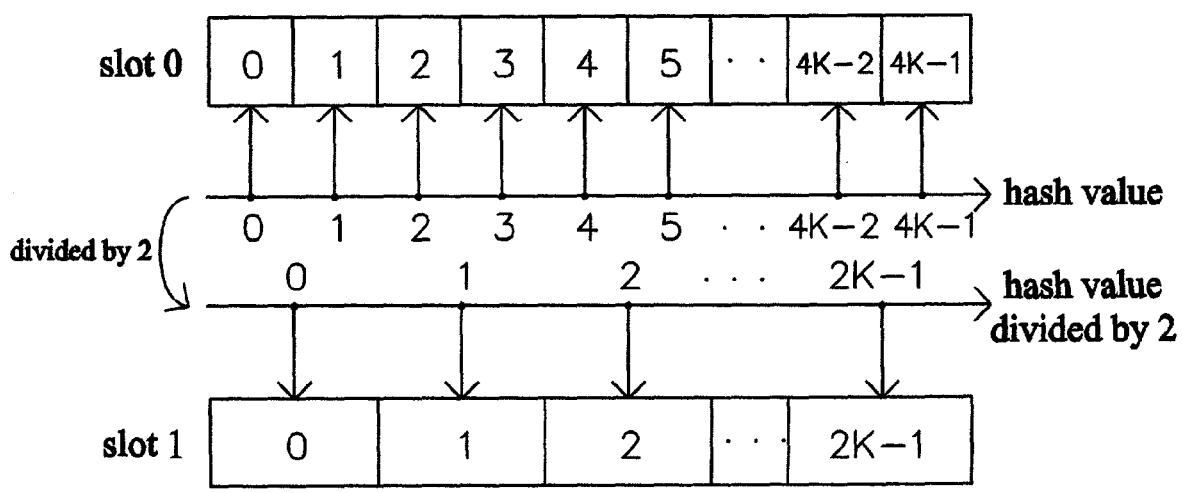
FIG. 5B shows a data access method for the non-symmetric dual-slot address table in FIG. 5A.

FIG. 5B shows a data access method for the non-symmetric dual-slot address table in FIG. 5A. As shown, the total quantity of slot 0 is a multiple of that of the slot 1, for example the multiple is 2 in the embodiment. When a tag of a SMAC address (SMAC tag) is to be written, a hash value is first generated according to the SMAC address, for example the hash value is 4. Therefore, the SMAC tag and its corresponding source port are written to a slot 0 corresponding to the bucket (4).

When the SMAC tag is tried to be written to the slot 0 corresponding to the bucket (4) and the slot 0 has stored data, it means that a previous certain SMAC address having the same hash value has already occupied the slot 0 in bucket (4). Therefore, the later SMAC address has to be written to the slot 1. However, because the number of the slot 0 is twice the number of the slot 1, the SMAC address cannot be directly written to the slot 1. Its corresponding hash value has to be divided by 2 first and then added with a reference address, for example 4K−1, to obtain a sub-address. Then, the later SMAC address is written to the slot 1 of the entry 1 corresponding to the sub-address. In other words, because the total number of the slot 1 is only half of the number of the slot 0, two adjacent slots 0 share one slot 1, as shown in FIG. 5B. It should be noted that the MAC address written to the slot 1 is according to an address (herein 2+(4K−1)), which is derived from the original address (herein, 4) divided by 2.

When the two associated slots have already stored data, the SMAC tag and the source ports can be selectively written to one of the slots, preferably, where has not been accessed for a longer time. Furthermore, if the data in the slot 0 is not accessed for a predetermined time period, the data in the slot 1 is then moved to the slot 0 to empty the slot 1, such that the write or look-up can become faster.

As described above, each slot 1 corresponds to two adjacent buckets. To confirm where the data in slot 1 comes from, an overflow flag is introduced. For example, the bucket (4) and the bucket (5) corresponding to the slot 0 share one slot 1. When two MAC addresses having the same hash value 4 are in collision, the later MAC address can be written to an associated slot 1; similarly, when two MAC addresses having the same hash value 5 are in collision, the later MAC address can be written to the associated slot 1. Therefore, the hash value for the data stored in the associated slot 1 may be 4 or 5. In order to make sure that where the data in slot 1 comes from, an overflow flag is introduced. This situation can happen in any slot 1. As a result, when the data is written to the slot 1, an overflow flag should be introduced to distinguish the source. In the following paragraphs, several examples for the overflow tag are described.

Next, examples for adding the overflow tag are described when the hash value is 4 or 5. For example, assume that the hash value for a certain SMAC address is 4 and its corresponding slot 0 has been occupied. Because the total number of the slots 0 is twice the number of the slots 1, the hash value is first divided by the multiple, which means the hash value 4 is divided by 2, before the SMAC address is written to the slot 1, by which a quotient 2 is obtained for example. Afterwards, according to the quotient, a sub-address (2) is found in the non-symmetric dual slot address table 510. Then, a reference address 4K−1 is added with the quotient, by which a slot 1 corresponding to a sub-address (2+4K−1) is selected from the entry 1. In addition, the remainder 0 after divided by 2 is set as the overflow flag, and then the MAC tag and the overflow flag are written. If the hash value for a certain SMAC address after operation is 5, the hash value is first divided by the multiple 2, which means the hash value 5 is divided by 2, to obtain a quotient 2. Afterwards, according to the quotient, a sub-address (2+4K−1) is found in the non-symmetric dual slot address table 510, and then, a slot 1 corresponding to a sub-address (4K+1) is selected from the entry 1. In addition, the remainder 1 after divided by 2 is set as the overflow flag. In the following paragraph, a method for looking up the non-symmetric dual slot address table is described.

As mentioned above, when transmitting the packet, a CRC hash operation is performed to the DMAC address of the packet to generate a hash value, and then a SMAC tag is read from the slot 0 corresponding to the hash value in the entry 0. The SMAC tag and the DMAC tag are compared. If the SMAC tag and the DMAC tag are consistent, the packet is transmitted according to the source port stored in the slot 0. Since the total numbers of the slots 0 and the slots 1 are different, it depends on a sub-address when the data is written to the slot 1. Then, the data is written to the slot 1 corresponding to the sub-address in the entry 1. Therefore, if the result of looking up the address table is not consistent with the data in the slot 0, then the desired data may be stored in the associated slot 1. Therefore, a sub-address has to be found first, and then the SMAC tag and the overflow flag are read from the slot 1 corresponding to the sub-address in the entry 1 to compare. If consistent, it means that the source port stored is the correct destination of the packet. Then, the packet is transmitted to the destination accordingly. If the comparison result is not consistent, the packet is sent by broadcast.

For example, the bucket (4) and the bucket (5) share one slot 1, in which the address data maybe associate with the bucket (4) or the bucket (5) in entry 0. Accordingly, in order to confirm the source when the data is read from the slot 1, the overflow flag is very important. If the overflow in the sot 1 is 0, it represents that the data in slot 1 is the later SMAC address when two SMAC addresses having the same hash value 4 are in collision. In contrast, if the overflow in the sot 1 is 1, it represents that the data in slot 1 is the later SMAC address when two SMAC addresses having the same hash value 5 are in collision. Therefore, the hash value, the SMAC tag and the overflow flag are required for looking up the entry 1 portion of the address table.

In brief, if the non-symmetric dual-slot address table has 6K entries, the size of the entry 0 is 4K and the size of the entry 1 is 2K, and every two slots 0 share one slot 1. Therefore, one-bit overflow flag is enough. If the non-symmetric dual-slot address table has 10K entries, the size of the entry 0 can be 8K and the size of the entry 1 is 2K, and every four slots 0 share one slot 1. Therefore, a two-bit overflow flag is enough. If the multiple between the total numbers of the slots 0 and the slots 1 is changed, the number of bits of the overflow flag is changed accordingly to meet the practical requirement.

Accordingly, the invention provides a data access method for a non-symmetric dual-slot address table. The non-symmetric dual-slot address table contains two entries each having a different size, i.e., the number of slots of the entry 0 is a multiple of the number of slots of the entry 1. The steps are described as follows.

When writing the data, a CRC hash operation is performed to the SMAC address to obtain a hash value, and then the tag of the SMAC address (the SMAC tag) is written to a slot 0 corresponding to the hash value in the entry 0. When there already exists data in the slot 0 corresponding to address in the entry 0, the hash value is further mapped one-by-one to a sub-address and a share value, and then a slot 1 corresponding to the sub-address is selected from the entry 1. Afterwards, the SMAC tag, the share value and the source port are written to the slot 1.

In addition, when transmitting the packet, a CRC hash operation is performed to the DMAC address to generate a hash value. Then, a SMAC tag stored in the slot corresponding to the hash value in the entry 0 is read, and is compared with the DMAC tag. If the comparison of the SMAC tag and the DMAC tag is the same, the packet is transmitted according to the source port in the slot. In contrast, when the DMAC tag and the SMAC tag stored in the slot 0 corresponding to the address in the entry 0 is not the same, then the hash value is further mapped to a sub-address and a share value. Then, the DMAC tag and the share value are compared with the SMAC tag and the share value stored in the slot 1 corresponding to the sub-address in the entry 1. If the comparison is the same, the packet is transmitted according to a source port stored in the slot 1 corresponding to the sub-address in the entry 1.

The invention further provides a switching apparatus having a plurality of ports. The switching apparatus receives a packet having a SMAC address and a DMAC address from a source port. The switching apparatus comprises a memory, a writing device and a transmitting device. The memory preferable is a SRAM and has a non-symmetric dual-slot address table, wherein the non-symmetric dual-slot address table has a first entry with m slots and a second entry with n slots, m and n are integers and m is an integer multiple of n, and is used for accessing a plurality of MAC addresses.

The writing device is used for writing the SMAC address to the non-symmetric dual-slot address table. A first hash value is generated according to the SMAC address data. A first address corresponding to the first hash value from the non-symmetric dual-slot address table is selected. Next, when the slot corresponding to the first address in the first entry is empty, a tag and the source port of the SMAC address data are written to a slot corresponding to the first address in the first entry. The first hash value is then mapped one-by-one to a first sub-address and a first share value when the slot corresponding to the first address in the first entry is not empty. Then a slot corresponding to the first sub-address in the second entry is selected, and the tag, the first share value and the source port of the SMAC address data are written to the slot corresponding to the first sub-address in the second entry.

In addition, the transmitting device is used for transmitting the packet to a destination port in the switching apparatus. A second hash value is generated according to the DMAC address. A second address corresponding to the second hash value is selected from the non-symmetric dual-slot address table. The packet is transmitted according to a destination port in a slot corresponding to the second address in the first entry, when a tag of the MAC address is consistent with a tag of the SMAC address in a slot corresponding to the second address in the first entry; and the packet is transmitted according to a source port stored in a slot corresponding to a second sub-address in the second entry, when the tag and the second share value of the DMAC address is consistent with a tag and a share value of a SMAC address stored in a slot corresponding to the second sub-address.

The mapping method above is that any hash vale is first divided by an integer multiple to obtain a quotient and a remainder. According to the quotient, the corresponding sub-address can be obtained and the remainder is the associated share value.

Furthermore, the slot corresponding to the address in the first entry is defined to be associated with the slot corresponding to the first sub-address. When the two associated slots have stored data, the SMAC tag, the share value and the source port are selectively written to one of the slots where data has not been accessed for a predetermined time. In addition, when both the slot corresponding to the first address and the slot corresponding to the first sub-address have stored data, and if the data stored in the slot corresponding to the first address has not been accessed for a predetermined time, the data stored in the slot corresponding to the first sub-address is moved to overwrite the slot corresponding to the address, and the slot corresponding to the first sub-address is emptied. Moreover, when the SMAC tags stored in the slot corresponding to the second address and the slot corresponding to the second sub-address are different from the DMAC tag, the packet is then broadcasted.

It should be noted that all parameters used in the embodiment is merely an example, not to restrict the scope of the invention. Any one skilled in the field can adjust or modify the parameters to achieve the same or similar functions of the invention.

According to the data accessing method for the non-symmetric dual-slot address table, the memory can be effectively utilized by sharing the slots. Because the memory in the switching apparatus has to be used in many applications, so the memory resource is very important and has to be arranged carefully. The switching apparatus of the invention provides a method to make the system provider to more flexibly arrange the memory.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

The invention claimed is:

1. A data writing method for a non-symmetric dual-slot address table, wherein the non-symmetric dual-slot address table has a first entry with m slots and a second entry with n slots, m and n are integers and m is an integer multiple of n, the method comprising steps of:
generating a hash value according to a SMAC address;
selecting an address corresponding to the hash value for the non-symmetric dual-slot address table;
writing a tag and a source port for the SMAC address to a slot corresponding to the selected address in the first entry, when the slot corresponding to the selected address in the first entry is empty; and
mapping the hash value to a sub-address and a share value when the slot corresponding to the address in the first entry is not empty, and then selecting a slot corresponding to the sub-address in the second entry, and writing the tag, the share value and the source port for the SMAC address to the slot corresponding to the sub-address in the second entry.

2. The method of claim 1, wherein the mapping step comprises dividing the hash value by an integer to obtain a quotient and a remainder, wherein the corresponding sub-address is obtained according to the quotient, and the remainder is the corresponding share value.

3. The method of claim 1, wherein m is 4K and n is 2K, $K=2^{10}$.

4. The method of claim 3, wherein the share value is one bit.

5. The method of claim 3, wherein the share value has two bits.

6. The method of claim 1, wherein m is 8K and n is 2K, $K=2^{10}$.

7. The method of claim 1, wherein the slot corresponding to the address in the first entry is defined to be associated with the slot corresponding to the sub-address, when the two associated slots have stored data, the SMAC tag, the share value and the source port are selectively written to one of the slots where data has not been accessed for a long time.

8. The method of claim 1, further comprising when both the slot corresponding to the address and the slot corresponding to the sub-address have stored data, and if the data stored in the slot corresponding to the address has not been accessed for a predetermined time, the data stored in the slot corresponding to the sub-address is moved to overwrite the slot corresponding to the address, and the slot corresponding to the sub-address is emptied.

9. A method for looking up a non-symmetric dual-slot address table to transmit a packet, wherein the packet comprises a SMAC address and a DMAC address, and the non-symmetric dual-slot address table has a first entry with m slots and a second entry with n slots, m and n are integers and m is an integer multiple of n, the method comprising steps of:
generating a hash value according to the DMAC address;
selecting an address corresponding to the hash value for the non-symmetric dual-slot address table;
transmitting the packet according to a destination port specified in a slot corresponding to the selected address in the first entry, when a tag of the MAC address is consistent with a tag of the SMAC address in a slot corresponding to the said selected address in the first entry; and
transmitting the packet according to a source port specified in a slot corresponding to a corresponding sub-address in the second entry, when the tag and a share value of the DMAC address is consistent with a tag and a share value of a SMAC address stored in a slot corresponding to the sub-address.

10. The method of claim 9, wherein the mapping step comprising dividing the hash value by an integer to obtain a quotient and a remainder, wherein the corresponding sub-address is obtained according to the quotient, and the remainder is the corresponding share value.

11. The method of claim 9, further comprising step of: broadcasting the packet when the SMAC tags stored in the slot corresponding to the address and the slot corresponding to the sub-address are different from the DMAC tag.

12. A switching apparatus having a plurality of ports, for transmitting a packet having a SMAC address and a DMAC address from a source port of said plurality of ports, the switching apparatus comprising:
- a memory, having a non-symmetric dual-slot address table, wherein the non-symmetric dual-slot address table has a first entry with m slots and a second entry with n slots, m and n are integers and m is an integer multiple of n, and is used for accessing a plurality of MAC addresses;
- a writing device, for writing the SMAC address to the non-symmetric dual-slot address table, wherein a first hash value is generated according to the SMAC address; an first address corresponding to the first hash value from the non-symmetric dual-slot address table is selected; a tag and the source port for the SMAC address are written to a slot corresponding to the first address in the first entry, when the slot corresponding to the first address in the first entry is empty; and the first hash value is mapped to a first sub-address and a first share value when the slot corresponding to the first address in the first entry is not empty, and then a slot corresponding to the first sub-address in the second entry is selected, and the tag, the first share value and the source port of the SMAC address are written to the slot corresponding to the first sub-address in the second entry; and
- a transmitting device, for transmitting the packet to a destination port, wherein a second hash value is generated according to the DMAC address; an second address corresponding to the second hash value is selected for the non-symmetric dual-slot address table; the packet is transmitted according to the destination port in a slot corresponding the second address in the first entry, when a tag of the MAC address is consistent with a tag of the SMAC address in a slot corresponding to the second address in the first entry; and the packet is transmitted according to a source port stored in a slot corresponding to a second sub-address in the second entry, when the tag and the second share value of the DMAC address is consistent with a tag and a share value of a SMAC address stored in a slot corresponding to the second sub-address.

13. The apparatus of claim 12, wherein the mapping step comprising dividing the first or the second hash value by an integer multiple to obtain a quotient and a remainder, wherein the corresponding first or second sub-address is obtained according to the quotient, and the remainder is the corresponding first or second share value.

14. The apparatus claim 12, wherein m is 4K and n is 2K, $K=2^{10}$.

15. The apparatus of claim 14, wherein the share value has one bit.

16. The apparatus of claim 12, wherein a length of the hash value has twelve bits.

17. The apparatus of claim 12, wherein the slot corresponding to the first address in the first entry is defined to be associated with the slot corresponding to the first sub-address, when the two associated slots have stored data, the SMAC tag, the share value and the source port are selectively written to one of the slots where data has not been accessed for a longer time.

18. The apparatus of claim 12, further comprising when both the slot corresponding to the first address and the slot corresponding to the first sub-address have stored data, and if the data stored in the slot corresponding to the first address has not been accessed for a predetermined time, the data stored in the slot corresponding to the first sub-address is moved to overwrite the slot corresponding to the first address, and the slot corresponding to the first sub-address is emptied.

19. The apparatus of claim 12, wherein when the SMAC tags stored in the slot corresponding to the second address and the slot corresponding to the second sub-address are different from the DMAC tag, the packet is broadcasted.

20. The apparatus of claim 12, wherein the memory is a static random access memory.

* * * * *